(12) United States Patent
Taninaka et al.

(10) Patent No.: US 7,337,374 B2
(45) Date of Patent: Feb. 26, 2008

(54) PROGRAM, INFORMATION PROCESSING METHOD, INFORMATION PROCESSING APPARATUS, AND STORAGE APPARATUS

(75) Inventors: Dai Taninaka, Odawara (JP); Hideki Tanaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 542 days.

(21) Appl. No.: 10/422,930

(22) Filed: Apr. 23, 2003

(65) Prior Publication Data

US 2003/0200487 A1 Oct. 23, 2003

(30) Foreign Application Priority Data

Apr. 23, 2002 (JP) ............... 2002-120403

(51) Int. Cl.
G06F 11/00 (2006.01)
(52) U.S. Cl. .............. 714/57; 714/5; 714/21; 711/170
(58) Field of Classification Search .......... 714/21, 714/57, 5; 711/170
See application file for complete search history.

(56) References Cited

U.S. PATENT DOCUMENTS

| | | | | |
|---|---|---|---|---|
| 5,546,557 | A | * | 8/1996 | Allen et al. ............... 711/111 |
| 5,717,956 | A | * | 2/1998 | Shinosaka et al. ......... 710/65 |
| 5,784,702 | A | * | 7/1998 | Greenstein et al. ........ 711/173 |
| 5,960,451 | A | | 9/1999 | Voigt et al. |
| 6,467,023 | B1 | | 10/2002 | DeKoning et al. |
| 6,473,655 | B1 | * | 10/2002 | Gould et al. .............. 700/5 |
| 6,526,323 | B1 | * | 2/2003 | Miyajima et al. .......... 700/9 |
| 6,532,517 | B1 | * | 3/2003 | Wagner et al. ............ 711/112 |
| 6,584,582 | B1 | * | 6/2003 | O'Connor ................. 714/21 |
| 6,625,638 | B1 | * | 9/2003 | Kubala et al. ............. 718/105 |
| 6,934,889 | B2 | * | 8/2005 | Owari ...................... 714/46 |
| 2003/0221077 | A1 | | 11/2003 | Ohno et al. |
| 2003/0229690 | A1 | | 12/2003 | Kitani et al. |
| 2004/0123180 | A1 | | 6/2004 | Soejima et al. |

FOREIGN PATENT DOCUMENTS

| | | |
|---|---|---|
| JP | 05-197762 A | 8/1993 |
| JP | 06-12298 | 1/1994 |
| JP | 09-292954 A | 11/1997 |
| JP | 10-320126 A | 12/1998 |
| JP | 11-161431 A | 6/1999 |
| JP | 2000-020201 A | 1/2000 |
| JP | 2000-029639 A | 1/2000 |
| JP | 2000-056826 A | 2/2000 |
| JP | 2000-242434 A | 9/2000 |
| JP | 2001-143367 A | 5/2001 |
| JP | 2001-282632 A | 10/2001 |
| JP | 2003-345518 | 12/2003 |

OTHER PUBLICATIONS

Japan Patent Office (JPO) office action dated Sep. 27, 2007 for JPO patent application laid open JP2002-120403.

* cited by examiner

Primary Examiner—Scott Baderman
Assistant Examiner—Joshua Lohn
(74) Attorney, Agent, or Firm—Townsend and Townsend and Crew LLP

(57) ABSTRACT

The present invention controls storage apparatuses, and saves setting information of the storage apparatuses, transmits the saved setting information to the storage apparatuses, receives from the storage apparatuses results of processing for the setting information, retains the setting information for which the processing results are in error, and executes processing for the setting information with the error.

28 Claims, 11 Drawing Sheets

CLUSTER NUMBER —Port# — Group# —LU (CU : LDEV)

| P-VOL INFORMATION | | | | | S-VOL INFORMATION | | |
|---|---|---|---|---|---|---|---|
| Port | Group | Path | MU | Status | Port | Group | |
| CL1-A | 00 | 00(00:00) | 0 | PSUE | CL1-J | 00 | |
| CL1-J | 00 | 01(01:11) | 1 | PSUS | CL1-J | 00 | |
| CL1-A | 00 | 00(00:00) | 0 | PSUE | CL1-J | 00 | |
| CL1-A | 00 | 02(00:02) | 0 | PSUE | CL1-J | 00 | |
| CL1-J | 00 | 01(01:11) | 1 | PSUS | CL1-J | 00 | |
| CL1-A | 00 | 02(00:02) | 0 | PSUE | CL1-J | 00 | |
| CL1-J | 00 | 30(00:00) | 0 | PSUE | CL1-J | 00 | |
| CL1-J | 00 | 01(01:11) | 1 | PSUS | CL1-J | 00 | |
| CL1-J | 00 | 30(00:00) | 0 | PSUE | CL1-J | 00 | |
| CL1-J | 00 | 32(00:02) | 0 | PSUE | CL1-J | 00 | |
| CL1-J | 00 | 01(01:11) | 1 | PSUS | CL1-J | 00 | |
| CL1-J | 00 | 32(00:02) | 0 | PSUE | CL1-J | 00 | |

ONE CASCADE STRUCTURE (CASCADE PAIR GROUP) (90).

FIG.13

| P-VOL INFORMATION | | | | | S-VOL INFORMATION | | | |
|---|---|---|---|---|---|---|---|---|
| Port | Group | Path | MU | Status | Port | Group | S-Vol Path | SVolM |
| CL1-A | 00 | 02(00:02) | 0 | COPY(PD) | CL1-A | 00 | 00(00:00) | |
| CL1-A | 00 | 00(00:00) | 1 | COPY(PD) | CL1-E | 00 | 01(00:61) | |
| CL1-A | 00 | 00(00:00) | 2 | COPY(PD) | CL1-B | 00 | 01(00:19) | |
| CL1-A | 00 | 02(00:02) | 1 | COPY(PD) | CL2-K | 00 | 01(01:F9) | |
| CL2-K | 00 | 01(01:F9) | 1 | COPY(PD) | CL1-G | 00 | 02(00:92) | |
| CL2-K | 00 | 01(01:F9) | 2 | COPY(PD) | CL1-G | 00 | 01(00:91) | |
| CL1-A | 00 | 02(00:02) | 2 | COPY(PD) | CL2-M | 00 | 02(02:2A) | |
| CL2-M | 00 | 02(02:2A) | 1 | COPY(PD) | CL2-E | 00 | 01(01:81) | |
| CL2-M | 00 | 02(02:2A) | 2 | COPY(PD) | CL1-A | 00 | 03(00:03) | |

PROGRAM, INFORMATION PROCESSING METHOD, INFORMATION PROCESSING APPARATUS, AND STORAGE APPARATUS

CROSS REFERENCE FOR PATENT APPLICATION RELATING TO PROGRAM, INFORMATION PROCESSING METHOD, INFORMATION PROCESSING APPARATUS, AND STORAGE APPARATUS

This application asserts the right of precedence based on the Japanese Patent Application No. 2002-120403 applied for on Apr. 23, 2002, and this application is incorporated in this specification.

BACKGROUND OF THE INVENTION

1. Field of the Invention

The present invention relates to a program, information processing apparatus, and storage apparatus.

2. Description of the Related Art

A plurality of host computers is connected to a plurality of storage apparatuses through a network. The storage apparatuses, also called storage, are constituted of disk array control apparatuses and disk arrays. Such a disk array is provided a plurality of disk devices for storing data. For executing the reading and writing of data to such a disk device, the disk array control apparatus receives commands from a host computer and controls the input and output of that data. A client computer, which is a storage control terminal, is connected through a network to this disk array control apparatus. Storage control software (database control software) is installed on this client computer. The storage control apparatus generates and controls copies of data stored in the disk devices with the operation of this storage control software.

Specifically, the storage control terminal controls the generation of logical volumes in the disk array and performs operations such as generating and deleting cascade pairs of primary volumes and secondary volumes within the same storage apparatus. To have the disk array control apparatus execute processing relating to the settings for such logical volumes, the storage control apparatus displays the logical volume setting information on a display screen and provides storage control staff with an environment for work on the logical volume setting information.

The logical volume setting information contains a large amount of setting information relating to the volume pairs and, for copied volumes, further includes a hierarchical structure wherein the copied volumes are located. The volume pair setting information forming this hierarchical structure is organized in lines for each item of setting information and is collected as a volume list and displayed in tabular form. The tabular form makes possible the display of as much volume pair setting information as possible.

The storage control staff perform setting operations such as inputting and deleting parameters for each item of setting information, saving each item of volume pair setting information, and generate volume lists. The volume pair setting information in such a volume list is sent to the disk array control apparatus upon an operation by the storage control staff.

The disk array control apparatus executes sequential processing for each item of volume pair setting information in the component list of the logical volume received. The disk array control apparatus notifies the storage control terminal of the results of these processes in order. In the case where the results of the processing transmitted were an error (mistake), the storage control terminal just indicates that there was an error on the display screen. The storage control staff then must perform work over again to re-enter and correct the parameters for the setting information for which the error occurred, as well as for the setting information for every single volume pair thereafter. The amount of volume pair setting information saved in the volume list may include several thousand items, and setting and correcting all of the remaining setting information because of a single error makes necessary a large amount of work and is problematic.

Another problem is that all of the processing of the remaining setting information gets backed up because of a single error, and the processing is not executed.

Furthermore, when the volume list is displayed on the display screen of the storage control terminal, the volume pair setting information is simply arranged in tabular form in order of the parameters such as the port number, group number, and path number. For this reason, it is very difficult for the storage control staff to understand the hierarchical structure for each item of setting information. The task of editing the volume list is therefore very complicated.

SUMMARY OF THE INVENTION

The present invention controls storage apparatuses, and saves setting information of the storage apparatuses, transmits the setting information saved to the storage apparatus, receives the results of processing for the setting information from the storage apparatus, retains the setting information for which the result of the processing was an error, and executes processing for the setting information with the error.

In addition, the issues disclosed in this application and the methods for the resolution thereof are made clear by the section concerning the embodiments of the invention and the drawings.

BRIEF DESCRIPTION OF THE DRAWINGS

The following explanation should be referenced along with the attached drawings in order for a more complete understanding of the present invention and its advantages.

FIG. 13 is a frame format view showing the modified Preset volume list box showing sorted setting information, relating to an embodiment of the present invention.

DESCRIPTION OF THE PREFERRED EMBODIMENTS

Figure 1:
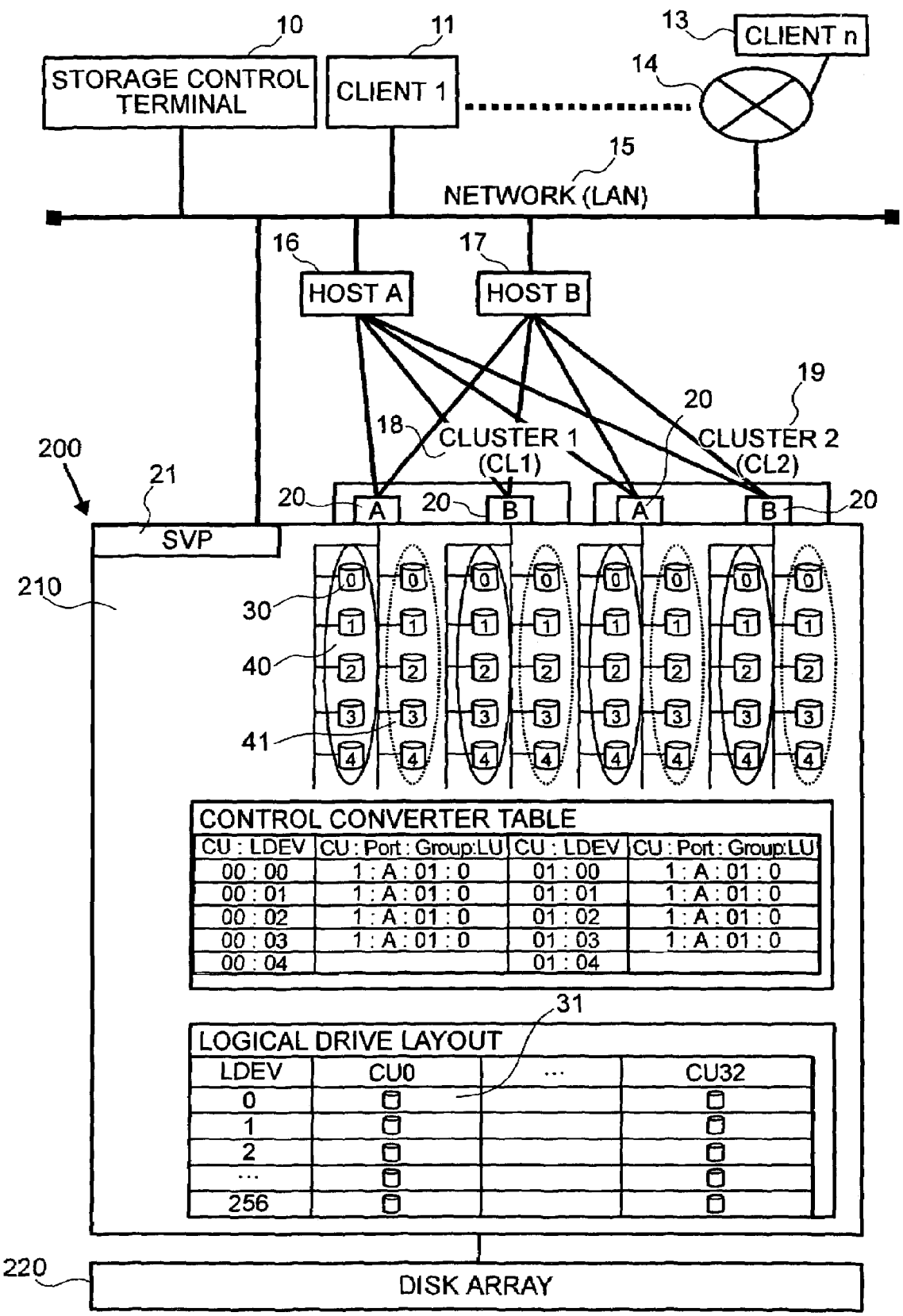
FIG. 1 is a block diagram showing the overall constitution of the storage system which is an embodiment of the present invention.

As noted in the specification, the following at a minimum will be made clear.

For the plurality of the setting information sent to the storage apparatus according to the operator's designation of the transmitting sequence or selection of the setting information to be sent, the transmitting step may also involve transmitting the designation or the selected setting information to the storage apparatus.

The setting information, at least in the case of the error, may be displayed on the display screen.

The present invention may also be provided a step for deleting the setting information, received in the reception step, from the setting information saving means in the case where the results of the processing are normal.

The error processing execution step may execute the processing according to an operation by the operator.

The error processing execution step may generate new setting information and transmit this information to the storage apparatus according to an operator's operation relating to the setting information with an error.

The action for retaining the setting information with an error may be executed repeatedly with the error setting information retaining step; and the action for generating new setting information and transmitting this information to the storage apparatus, according to an operator's operation relating to the setting information with an error, may be executed repeatedly with the error processing execution step.

The operator's operation relating to the setting information with an error may delete the setting information with the error from the setting information saving means with the error processing execution step.

The operator's operation relating to the setting information with an error adds new setting information with the error processing execution step.

The setting information may be information on settings relating to copies of the logical volumes stored by said storage apparatuses.

The storage apparatuses are controlled by the information processing apparatus for controlling the storage apparatuses and executing the information processing method. The storage apparatuses comprise means for receiving a plurality of setting information on the storage apparatuses from the information processing apparatus; means for executing the processing based on the setting information; means for notifying the information processing apparatus of the execution results and said setting information, at least when an error has occurred; and means for continuing to execute processing relating to other items of the setting information following the setting information for which the error occurred.

A setting information sorting step for dividing the copy relationship of the setting information into superordinate and subordinate levels, and a display step for separately arranging the superordinate level of the copy relationship and the subordinate level of the copy relationships, and displaying this information on a display screen, are provided to the information processing method of the information processing apparatus which is provided means for storing logical volume copy information, storing setting information relating to the hierarchical copy relationship of the logical volume stored by the storage apparatus and its copy.

The display step may display the setting information for inspection.

The following steps are provided to the information processing method of the information processing apparatus which is provided means for storing the logical volume copy information, storing setting information relating to the hierarchical copy relationship of the logical volume stored by the storage apparatus and its copy: a group unit sorting step for sorting the copy relationship of the setting information by hierarchical group constituted of the superordinate logical volume and its copy; a hierarchical group arranging step for arranging by the hierarchical groups, on the basis of the setting information of the highest level logical volume in each hierarchical group, to be arranged and displayed by the hierarchical group; an upper level display copy relationship selecting step for selecting the copy relationship relating to the copy with the smallest copy number in the superordinate level in the hierarchical group, to be displayed on the upper portion of the display screen; a next level display copy relationship arranging step for arranging the copy relationship of the copy, in the subordinate level where the copy displayed on the upper level is the primary volume, for display on the next level and below from the copy relationship displayed on the upper level in ascending order by copy number; a copy relationship sorting and sequential execution step for sorting all of the copy relationships according to sequential execution of the following steps for all of the copy relationships: the upper level display copy relationship selecting step and the next level display copy relationship arranging step; and a display step for displaying the sorted copy relationships on the display screen.

The display step may display the copy relationships on the screen for undergoing operations relating to the editing of the setting information.

First Embodiment

FIG. 1 shows a block diagram including the storage control terminal (information processing apparatus), host computer, and client and storage apparatuses, relating to an embodiment of the present invention. A plurality of host computers (hereinafter "hosts") 16 and 17 are connected to a plurality of storage apparatuses (hereinafter "disk subsystems") 200 through an SAN (storage area network) 100. Each host 16 and 17 has applications installed by users, and shares a plurality of storage apparatuses 200 as external storage apparatuses for data necessary for the operation of the applications. A storage control terminal 10 can be connected to a plurality of hosts 16 and 17, and a plurality of storage apparatuses 200, through a local area network (LAN) 15 which is different from the SAN 40.

Each storage apparatus 200 is provided a disk control apparatus 210 and a disk array 220. This disk array 220 comprises a plurality of disk devices for storing data. The disk control apparatus 210 notifies the storage control terminal of data and the component information and performance of the disk array 220 through the port 20 of each cluster 18 and 19. This disk control apparatus 210 has an attached controller called a service processor (SVP) 21. This controller is contained therein as a control board with a CPU mounted thereon, or is constituted of an independent computer. The disk array 220 is controlled by a microprogram operating on the processor installed in this controller. For example, when there is a data reading request from hosts 16 and 17, the microprogram effects control for the reading of that data. Normally, the reading of data is performed through a cache. Data which are not present in the cache are read directly from the drive (disk device), and stored in a cache or sent without further processing to the hosts 16 and 17.

Processing results for the volume pair setting information sent from the storage control terminal 10 can be acquired by this microprogram while in operation.

The disk control apparatus 210 stores the component information of the logical drive (LDEV) of the disk array 220 to the control memory. As shown in FIG. 1, a control unit (CU) number and logical drive (LDEV) number are used as information for the storage apparatus to distinguish the logical drive (LDEV). This is written as CU:LDEV. The correspondence of the control units (CU) 0 to 32 to each of the LDEV 0 to 256 is displayed in the layout information for the logical drive (LDEV) shown in FIG. 1. The port number, the group number assigned to a plurality of logical disks 30 corresponding to each port (A, B) 20, and the logical unit (LU) are used as information for host devices such as the hosts 16 and 17, clients 11 and 13, and the storage control terminal 10 to distinguish the logical drive (LDEV). This is written as Port:Group:LU.

As shown in FIG. 1, the disk control apparatus 210 gives various types of instructions to the disk array 220 based on the control converter table relating CU:LDEV to Port:Group:LU.

Figure 2:
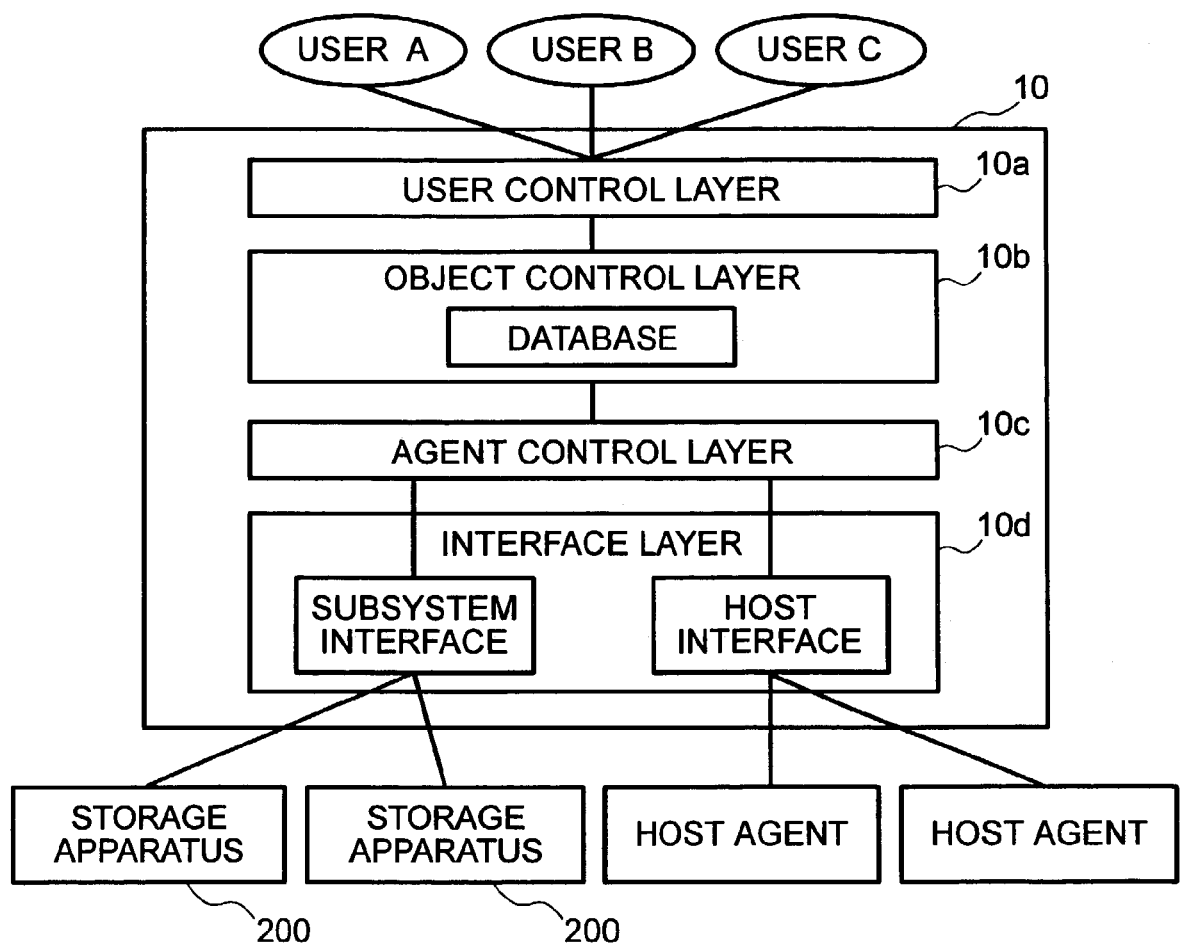
FIG. 2 is a block diagram showing the function of the storage control terminal relating to an embodiment of the present invention.

The storage control terminal 10 is constituted of a computer system. Installing and executing storage control software on a client 11 will allow it to function as a storage control terminal 10. FIG. 2 is a block diagram showing the functions of this storage control terminal 10. The storage control terminal 10 comprises a user control layer 10a, object control layer 10b, agent control layer 10c, and an interface layer 10dThe interface layer 10c is provided a subsystem interface and host interface. Also, the object control layer 10b is provided a database for saving component information relating to each disk array 220. Setting information for logical volumes is a type of this component information, as explained in the background art section. This logical volume setting information includes a large amount of setting information relating to volume pairs, and for copy volumes becomes a hierarchical (cascade) structure wherein the copy volumes are further present. A tree structure may be used instead of this hierarchical structure.

In FIG. 1, moreover, only one storage control terminal 10 is shown, although a plurality may also be present. Also, the storage control terminal 10 may also be disposed within a disk array 220. Furthermore, a storage control terminal portion having the function of the storage control terminal 10 made also be constituted as part of a disk array 220. Specifically, the term "storage control terminal" includes the meaning of "storage control portion" Also, the storage control terminal may be located at a location physically separated from the disk array 220.

Clients 11 and 13, used by a plurality of users A through C, are connected to the storage control terminal 10 through the user control layer 31. Also, the storage control terminal 10 is connected to the service processors (SVP) 21 of a plurality of storage apparatuses 200 through the subsystem interface of the interface layer 10dFurthermore, hosts 16 and 17 are connected to the storage control terminal 10 through the host interface 342.

The user control layer 31 controls the user terminals A through C. The object control layer 32 acquires the following information and stores this information in the database: setting information such as for logical volumes, and information relating to performance, trouble such as failures for each disk array 220, and other events as well. Information stored in this database includes the following: the internal access path of each disk array 220, logical disks, capacity and access authorization for each logical disk, settings relating to data shifting, settings (especially logical volume setting information) relating to copying data between disk arrays 220, settings for the performance and control of each disk array 220, the acquisition of performance data for each disk array, settings for maintenance methods, trouble such as failures, and component information for events resulting from user operations.

The next explanation concerns the operation for setting and controlling the constitution of the logical volumes and the storage apparatuses 200 using the storage control terminal 10. In particular, the explanation will focus on the operations for creating and deleting multiple cascade pairs of primary and secondary volumes within the same storage control apparatus 200. As shown in the frame format view in FIG. 3, a screen for setting and controlling the logical volumes is displayed with a GUI (graphical user interface) on the display of the storage control apparatus. On this screen, information relating to the following is arranged and displayed in tabular format: the port of the storage apparatus to which the storage control terminal 10 is connected, the logical volumes, and cascade pairs of primary and secondary volumes. Specifically, three types of boxes are displayed: a tree view box on the left side of the screen, a volume list box on the upper right portion of the screen, and the Preset volume list box on the lower right portion of the screen.

Figure 3:
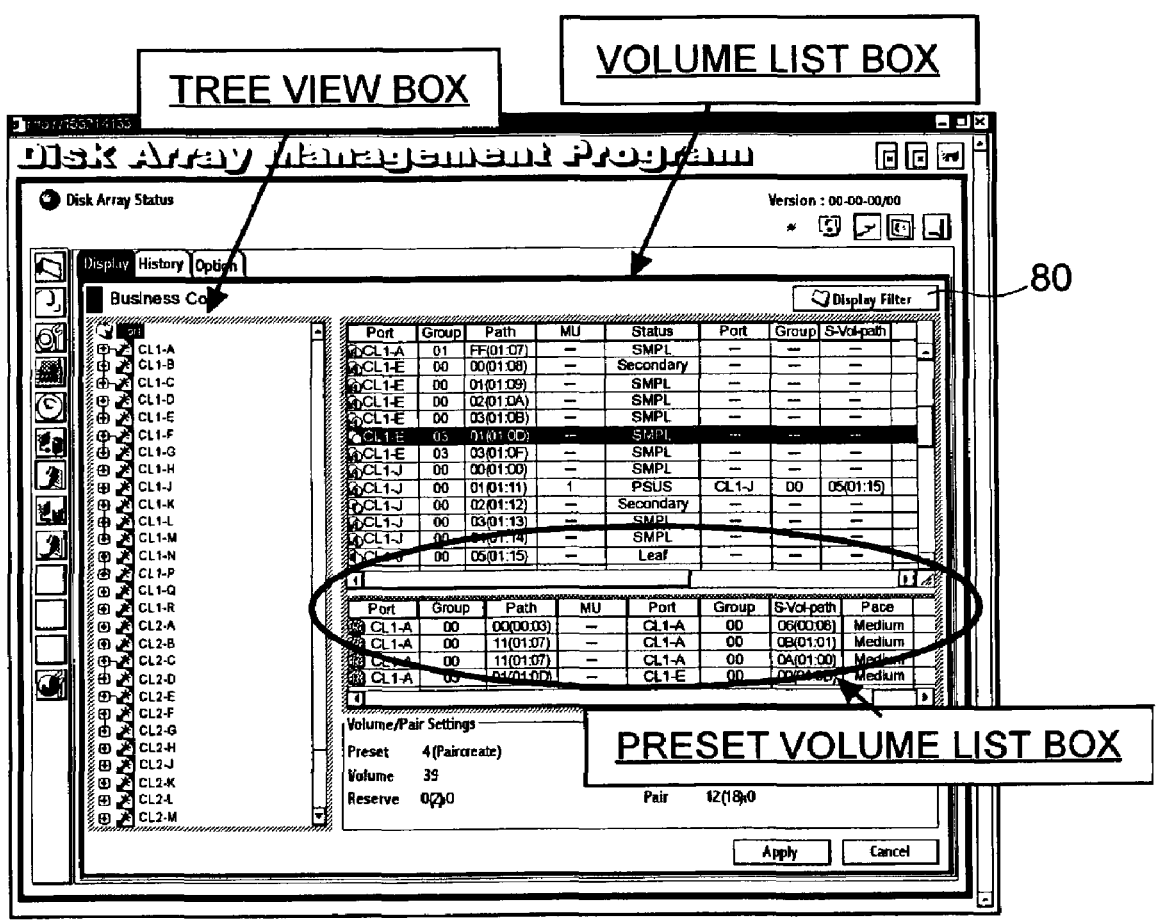
FIG. 3 is a frame format view showing a screen with a listing of the logical volume information displayed on the display of the storage control terminal, relating to an embodiment of the present invention.
Figure 4:
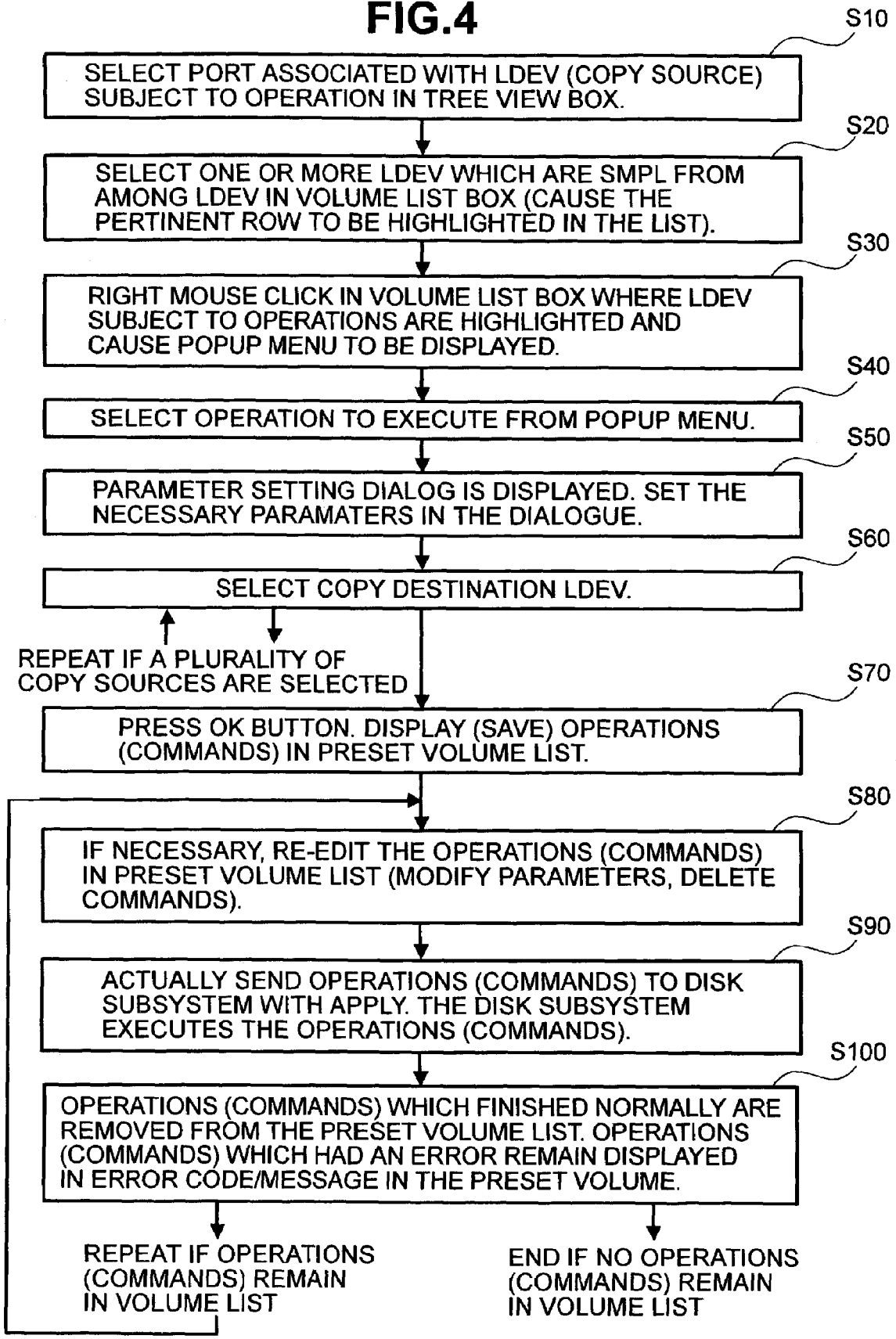
FIG. 4 is a flowchart showing the setting operation for making a copy of the logical volume, relating to an embodiment of the present invention.
Figures 5, 6:
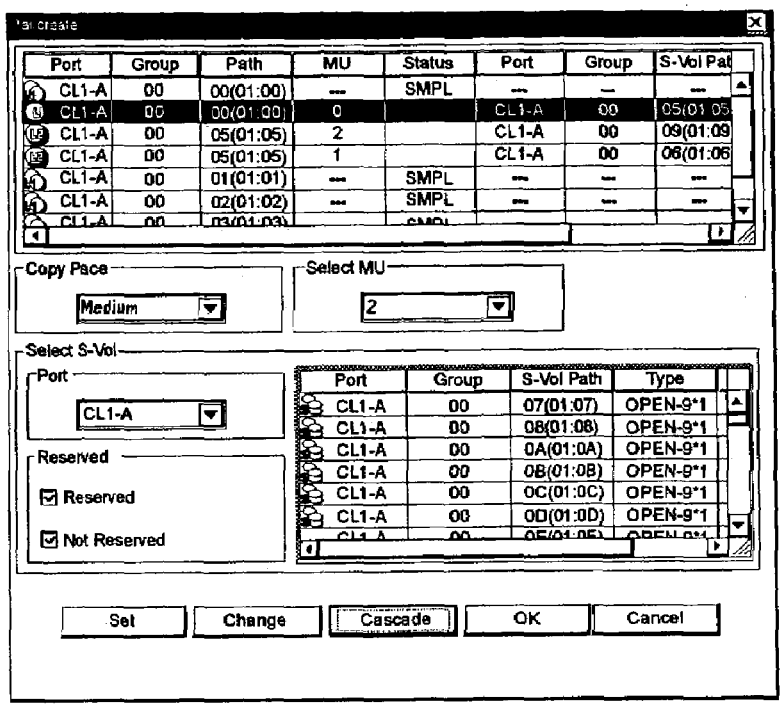
FIG. 5 is a flowchart showing the dialog for setting parameters to generate a secondary volume, relating to an embodiment of the present invention.
FIG. 6 is a frame format view showing the Preset volume list box for displaying the items of setting information for which an error occurred, relating to an embodiment of the present invention.

The setting operation for making a copy of the logical volume from the operation screen shown in FIG. 3 is explained with reference to the flowchart in FIG. 4. "S" in this flowchart means a step or process. The storage control staff (operator) uses an operating means such as a mouse and selects the port associated with the logical drive (copy source, LDEV), subject to the operation in the tree view box in FIG. 3 (S10). For example, the uppermost CL1-A is selected from among the ports shown in the tree view box. Thereupon, all of the setting information relating to the logical drive (LDEV) associated with the port CL1-A, selected in the tree view box, is shown in the volume list box. The storage control staff uses the mouse to select (selection of one or more is possible) the line showing the setting information of the copy source logical drive (LDEV) for generating (pair creation, Paircreat) the secondary volume (S20). The line containing the setting information of the logical drive selected in the volume list box is highlighted. Right clicking the mouse over the highlighted line of setting information displays a pop-up menu (S30). When, for example, the creation of a secondary volume (Paircreat) is selected from this menu (S40), the parameter setting dialog for creating the secondary volume is displayed as shown in FIG. 5. The necessary parameter settings and the copy destination logical drive are selected in this dialog (S50 to S60). Moreover, in the case where a plurality of copy sources are selected, the copy destination logical drive selection operation is correspondingly repeated. When the operations for setting general parameters and the selection of the copy destination logical drive is finished, the OK button in the dialog is clicked with the mouse (S70). Thereby, the setting information relating to the copies of a series of set logical volumes are saved (stored) as a Preset volume list and displayed in the Preset volume list box in FIG. 3. This Preset volume list takes on the role of a stack for accumulating setting information, which becomes a plurality of operation commands (parameters and commands for logical drives or the like), for causing the disk array control apparatus 210 to execute processing relating to the settings of the logical volumes.

Each line of setting information displayed in this Preset volume list box can be edited (S80). Specific examples of editing operations include the following: modifying parameters, adding and deleting setting information, modifying the sequence for transmitting the setting information, and designating the range of setting information to be transmitted (transmitting part or all of the information).

Setting information for which editing has finished is transmitted to the disk control apparatus 210. The disk control apparatus 210 executes the copying operation for the logical volumes in order based on this setting information. This disk control apparatus 210 notifies the storage control terminal 10 of the results of processing for the setting information (S90).

Having received the results of the processing, the storage control terminal 10 removes the setting information, for which the received processing results were normal, from the saved Preset volume list and deletes the setting information from the box in the display (S100). As a result, each line of setting information remaining in the Preset volume list box is that for which the processing result was an error; and the process for copying the logical volume in the storage apparatus 200 has failed (Fail). The details of these errors are transmitted from the disk control apparatus 210 along with the processing results.

The operation for the setting information which had an error is explained next. As shown in FIG. 6, an error code (the upper right portion of the table and the lower section of FIG. 6) is added with the item titled as "Code" to each line of setting information which remains displayed in the Preset volume list box. The type of error can be distinguished from this error code. Also, right-clicking the mouse on each line of setting information will cause a pop-up menu consisting of the following items to be displayed: delete the current line (Delete), delete all setting information (All Delete), and a detailed view (Detail) of the error contents. The new re-editing of the Preset volume list is performed by selecting an item from this popup menu and proceeding with the operations of correcting, modifying, adding, or deleting parameters. This re-editing operation is included in the process of S80 discussed above. When this re-editing operation has finished, the process in S90 is executed and the setting information is transmitted to the disk control apparatus 210. The above processes from S80 to S100 can be repeated until the setting information in the Preset volume list box disappears. Specifically, the processing in S80 to S100 can be repeated until all of the setting information is processed normally or until a response is made even if an error occurs.

In effect, if the setting information in the present volume list box disappears, the series of operations for copying the logical volumes has ended.

Second Embodiment

An improvement to the system for displaying cascade pairs (pairs in a cascade structure) of logical volumes is explained. As explained with reference to the frame format view in FIG. 3, cascade pairs, specifically pairs of copies (secondary volumes) generated in a hierarchical form for a large number of logical volumes (primary volumes) are displayed in tabular format, so that as many as possible can be viewed, on the display of the storage control terminal 10. For the display of a large number of cascade pairs in tabular format, display items such as the port (Port), group (Group), and path (Path) are arranged in descending order by rows as shown in FIG. 3.

Figure 7:
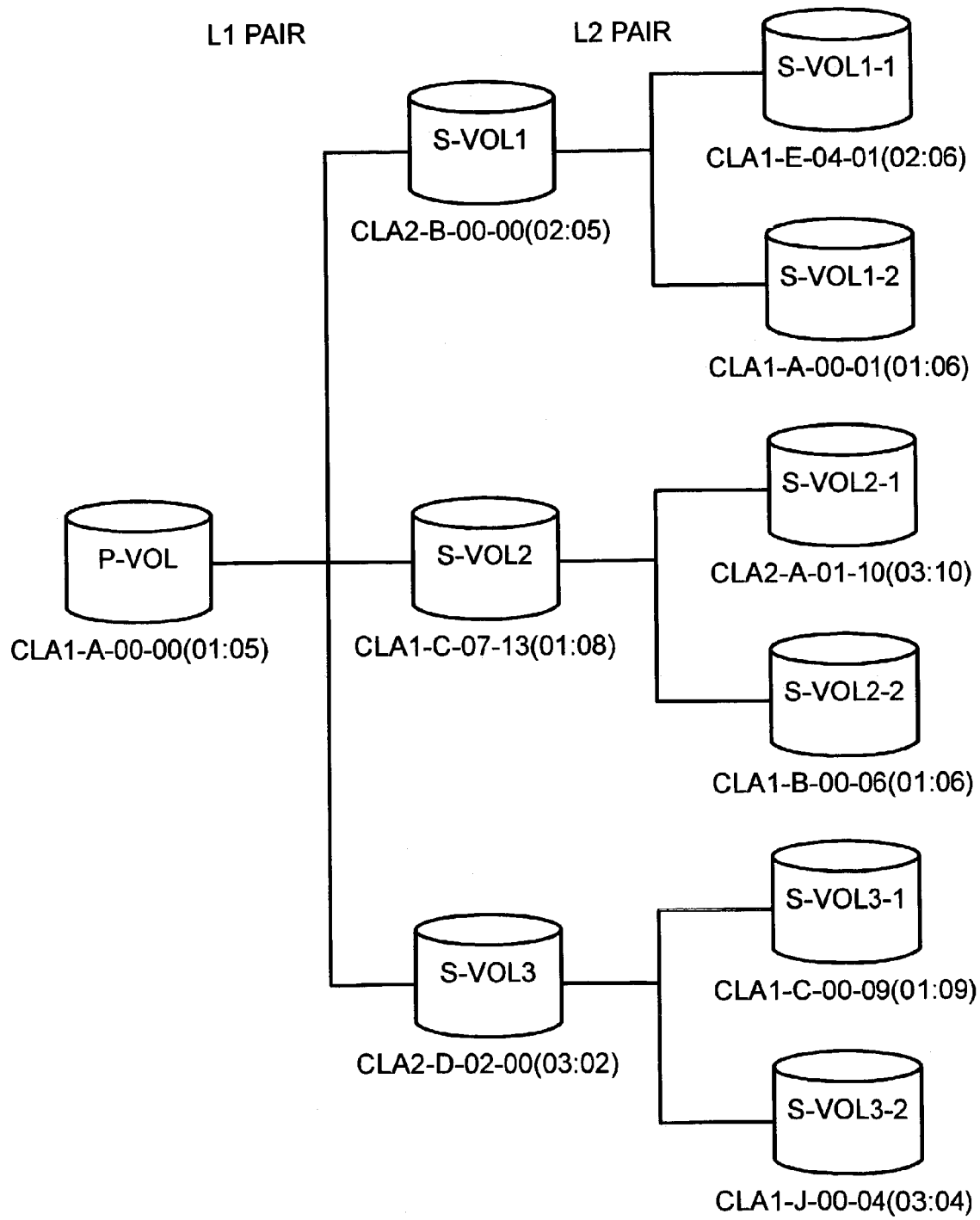
FIG. 7 is a schematic view showing the constitution of pairs of logical volumes located in the same cascade structure, relating to an embodiment of the present invention.

In view of balancing the load on the storage apparatuses 200, it is often the case that copies are not made within the same parity group. For this reason, a large number of copies is associated with different ports and groups. Consequently, with the tabular format in FIG. 3, it becomes difficult to distinguish pairs of logical volumes associated in the same cascade structure as shown in the schematic in FIG. 7. However, it is necessary to distinguish pairs of logical volumes associated with the same cascade structure as shown in FIG. 7 in order to perform the setting and control of logical volumes as explained in the first embodiment. Also, the setting information for as many cascade pairs as possible should be displayed on the screen.

In FIG. 7, moreover, a cascade structure comprising two levels is shown. The volume pair associated with the first level is shown as the L1 pair and the volume pair associated with the second level is shown as the L2 pair. The parameters displayed on each line in FIG. 3 (Port, Group, and Path, for example: CL1-A-00-00(01:05)) are located below the box showing each volume in FIG. 7. In each L1 pair, the primary volume is shown as P-VOL (primary volume) and the plurality of established secondary volumes are shown as S-VOL (secondary volume). Each S-VOL has an MU (multiple unit) number and these are distinguished as S-VOL1 through S-VOL3.

In each L2 pair, the primary volumes are S-VOL1 through S-VOL3 of the L1 pair; a plurality of secondary volumes is distinguished by MU number for S-VOL1 through S-VOL3. For example, the secondary volumes of S-VOL1 are displayed as S-VOL1-1 to S-VOL1-2.

In the present embodiment, the explanation concerns the GUI (graphical user interface) technology whereby cascade pairs associated with the same cascade structure as shown in FIG. 7 can be distinguished, and the setting information for as many pairs as possible can be displayed on screen. Two types of methods for the GUI technology in the present embodiment are explained. One of those is the method (second embodiment-1) for sorting the cascade pair setting information and displaying the information on the cascade display dialog screen shown in FIG. 8. The other is the method (second embodiment-2) for sorting the cascade pair setting information and displaying the information in the Preset volume list box in FIG. 3 wherein it is possible to edit the cascade pair setting information.

Second Embodiment-1

The second embodiment-1 is explained with reference to the cascade display dialog screen in FIG. 8 and the schematic view of cascade pairs displayed in the dialog screen in FIG. 8.

Figure 8:
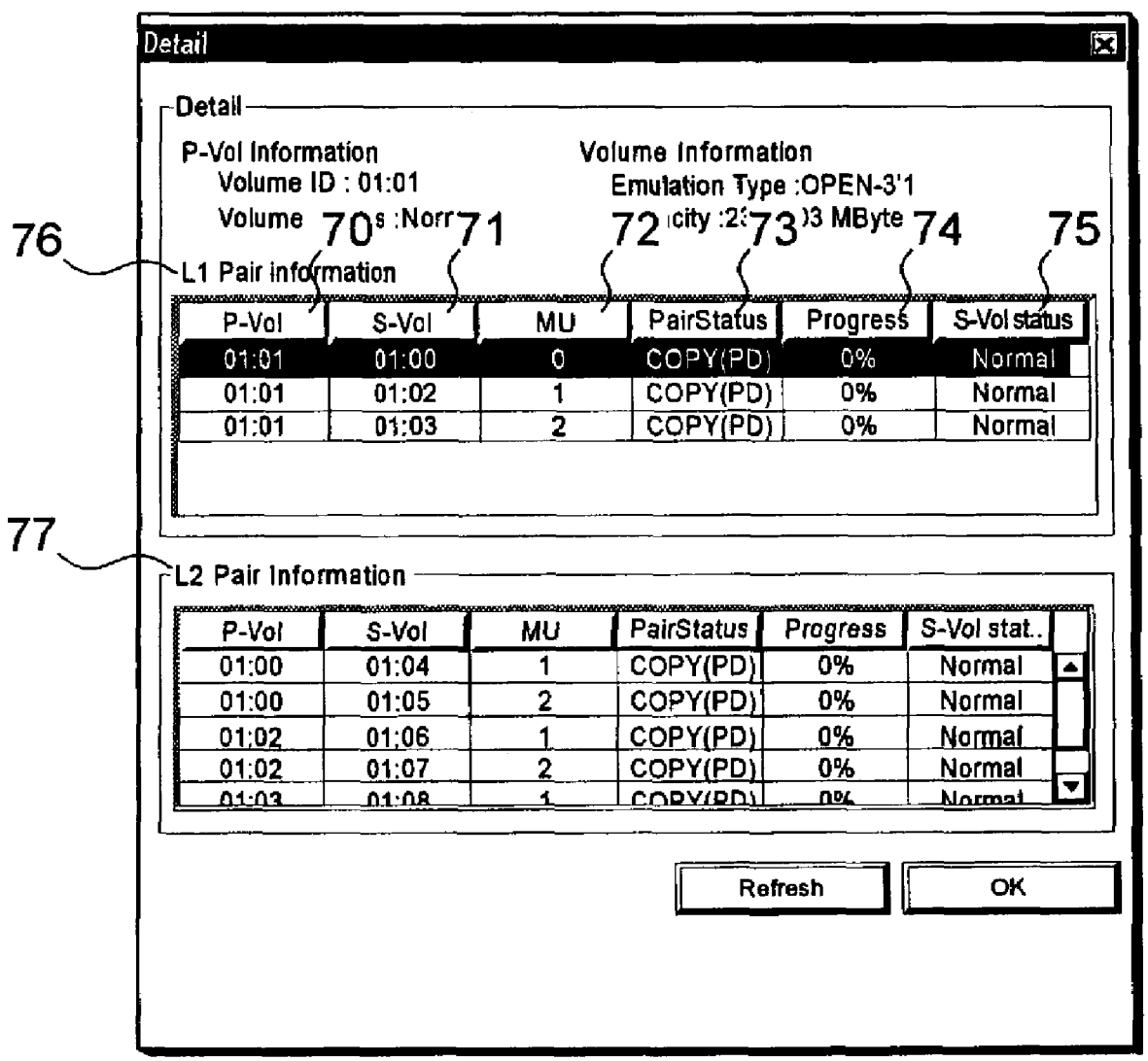
FIG. 8 is a table showing the dialog screen for cascade display, relating to an embodiment of the present invention.
Figure 9:
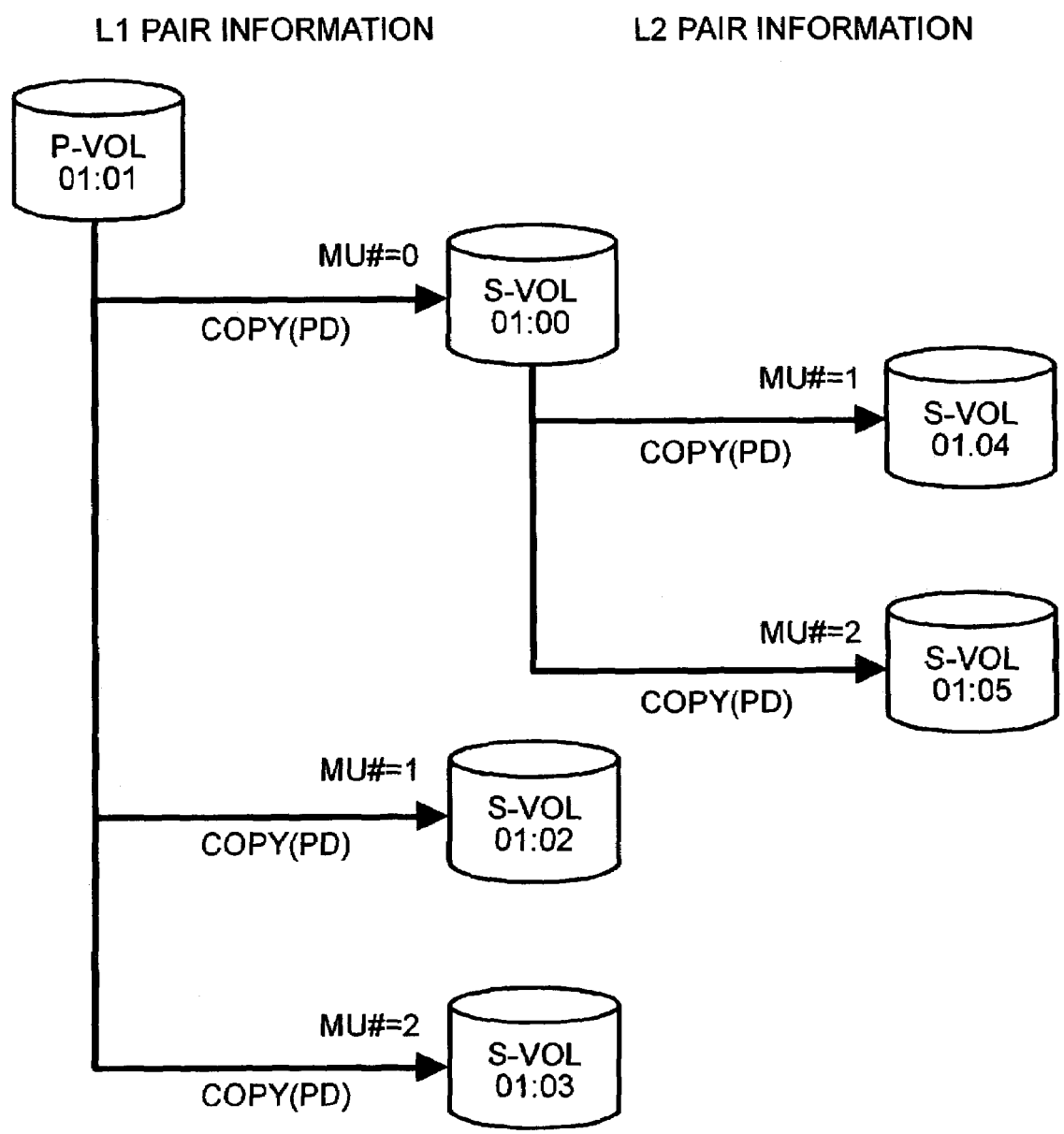
FIG. 9 is an idealized schematic view of the cascade pairs displayed in the dialog screen in FIG. 8, relating to an embodiment of the present invention.

The storage control software operating on the storage control terminal 10 includes a function to arrange the cascade pair setting information for the cascade pairs with prescribed rules, to allow intuitive understanding by the storage control staff of the entire schematic of pair groups in the cascade structure shown in FIG. 9, to allow the generation of the dialog screen as in FIG. 8.

The FIG. 8 dialog screen is shown when "DETAIL" in the lower portion of the popup menu in the upper part of FIG. 6 is selected. The popup menu in the upper part of FIG. 6, as discussed above, is displayed by selecting a volume or cascade pair from the volume list box in FIG. 3. Setting information relating to pair groups in the selected cascade structure is shown in the dialog screen in FIG. 8. When a plurality of S-VOL (secondary volumes) is present in the P-VOL (primary volume) of the selected cascade pair, setting information for all of the S-VOL shown in FIG. 9 is displayed.

In the upper left portion of the box titled "Detail" in the upper portion of the dialog screen in FIG. 8, P-VOL information is displayed as the title and therebelow, the CU (control unit):LDEV (logical drive) number, as the ID for the P-VOL, and the status of the LDEV are displayed. In the upper right portion of the box in the dialog screen in FIG. 8, volume information is displayed as the title and therebelow the emulation type and capacity of the LDEV are displayed.

Next are explained the rules for arranging the information of the pair groups (copy relationship) in the cascade structure shown in the central and lower portions of the box in the dialog screen in FIG. 8. The setting information of the L1 pair in the first level (upper level) in FIG. 9 and the setting information of the L2 pair in the second level (lower level) are separated and arranged. Next, the L1 pair setting information and L2 pair setting information are collected and displayed separately.

Specifically, the L1 pair list box 76 showing the L1 pair setting information is displayed in the central portion of the box in the dialog screen in FIG. 8. In this L1 pair list box 76, the following items are displayed: the CU:LDEV number 70 of the P-VOL, the CU:LDEV number 71 of the S-VOL, the MU (multiple unit) number 72, pair status 73 showing the status of the pair, progress 74 showing the rate of progress of pair copying, and the S-VOL leading status (normal or abnormal) 75.

The L2 pair list box 77 showing the L2 pair setting information is displayed in the lower portion of the box and the dialog screen. The items shown in the L2 pair list box 77 are the same as in the L1 pair list box 76, as shown.

In the present embodiment, information relating to pair groups (copy relationship) in the cascade structure can be arranged (sorted) and displayed. It thereby becomes possible for the storage control staff to intuitively understand the schematic of all pair groups in the cascade structure.

Second Embodiment-2

Figure 10:
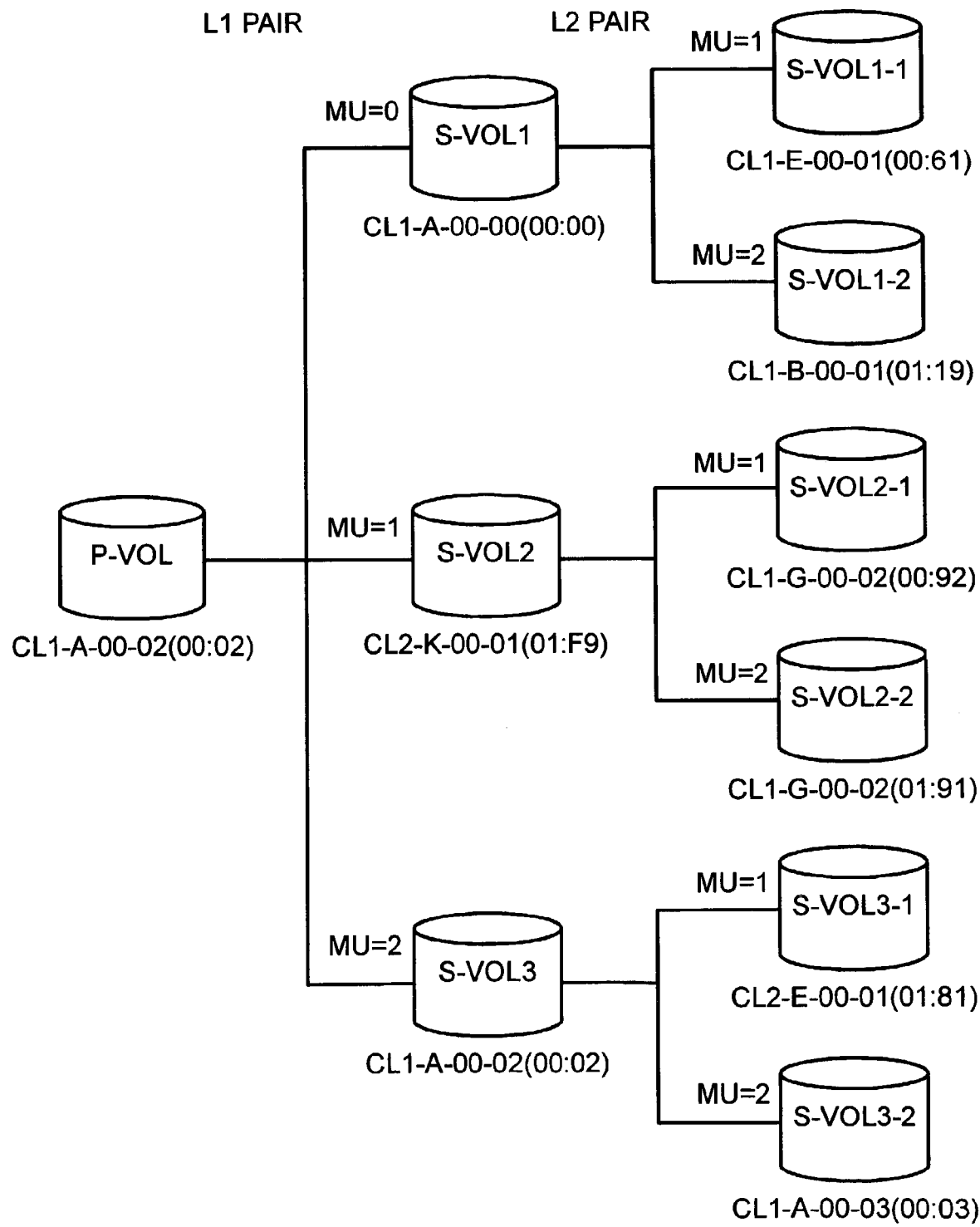
FIG. 10 is a schematic view showing the constitution of the logical volume pairs located in the same cascade structure, relating to an embodiment of the present invention.
Figures 11, 12:
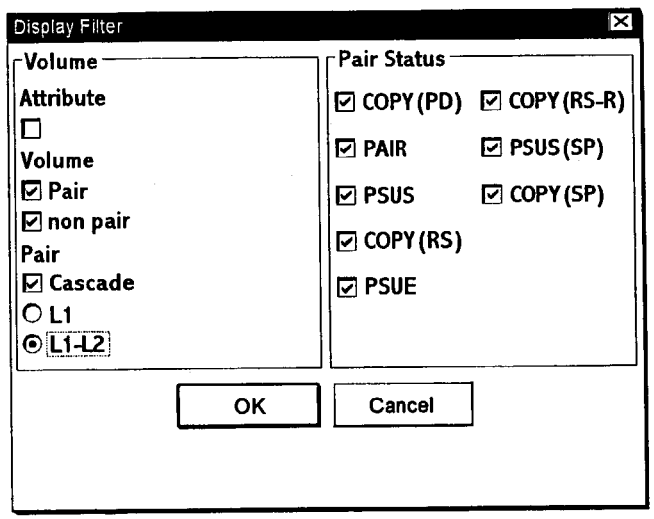
FIG. 11 is a frame format view showing the screen display of the filter dialog box relating to an embodiment of the present invention.
FIG. 12 is a frame format view showing the modified Preset volume list box for showing each item of setting information sorted by a group, relating to an embodiment of the present invention.

The storage control software operating on the storage control terminal 10 includes a function to arrange the cascade pair setting information for the cascade pairs with prescribed rules, to allow intuitive understanding by the storage control staff of the entire schematic of pair groups in the cascade structure shown in FIG. 10, so as to be able to generate the dialog screen as in FIG. 11.

As shown in FIG. 3, the display type of the cascade pair setting information in the Preset volume list box can be modified in the screen for performing setting and control of cascade pairs. First, the filter dialog box in FIG. 11 is displayed by double clicking with the mouse the "Display filter" operation input button shown in the upper right portion of the screen in FIG. 3.

The cascade pair setting information can be narrowed down by type and item, and the display thereof can be modified by checking the check boxes for each item in this box. In the present embodiment, the display type of the Preset volume list box in FIG. 3 is modified by checking the cascade item in the lower left portion of the box and then the L1-L2 item, and clicking the OK button. In effect, the setting information for each cascade pair is sorted and displayed according to prescribed rules as shown in FIG. 13, which shows the modified Preset volume list box.

Next are explained the sorting rules to display the cascade pair setting information in the volume list box shown in FIG. 13. Please refer to the schematic in FIG. 10 as well as FIG. 13.

The volume or cascade pair selected in FIG. 3 is sorted by the set of secondary volumes (hierarchical group) derived as the highest level.

In order for arrangement by the cascade pair group (hierarchical group) 90 shown in FIG. 12, these are then sorted in ascending order by each parameter (Port, Group, Path, MU) showing the highest level P-VOL information of each cascade pair.

Next, as the process for sorting the L1 pairs, sorting is performed to display in the upper level the cascade pair with the smallest MU number from among the plurality of L1 pairs (FIG. 10) in each cascade pair group (hierarchical group) 90. Then, as the L2 pair sorting process, sorting is performed for the plurality of L2 pairs associated with the sorted L1 pairs, to display the cascade pair with the small MU number at the next level of the L1 pair. Then, the L1 pair sorting process and L2 pair sorting process are executed sequentially as discussed above for the remaining L1 pairs.

As a result of the processing explained above, in the present embodiment, the information relating to the pair groups (copy relationship) of the cascade structure can be sorted and displayed as shown in the volume list box in FIG. 13. Thereby, the storage control staff can intuitively understand the schematic of all of the pair groups in the cascade structure as shown in FIG. 10.

The present invention was explained above specifically on the basis of the embodiments, but is not limited thereto and may be modified in various ways without departing from the substance thereof.

The embodiments can contribute to the following effects. Even if an error occurs for an item of setting information as a result of the processing of a volume pair setting information in the structural list of logical volumes, procedures will be performed for that setting information only. For this reason, the extra task of re-inputting the parameters for the setting information for subsequent and remaining volume pairs can be eliminated. Also, the processing for all remaining setting information is not delayed because of a single error and processing is executed for the remaining setting information.

While retaining the prior advantage of displaying as much volume pair setting information as possible in tabular format, the present invention makes it possible for the storage control staff to intuitively understand the entire pair structure in the cascade structure.

The error processing for setting information of storage apparatuses can be greatly simplified. Also, the hierarchical copy relationship between the logical volume and its copies can be displayed so that it is easily understood. Accordingly, for the control staff, this is a great improvement in the operability of the control terminal of the storage devices.

The optimal embodiments of the present invention were explained in detail, but it must be understood that it is possible to make various modifications, permutations, and improvements to these without departing from the spirit and scope of the invention as defined in the attached claims.

What is claimed is:

1. A computer-readable medium containing a program for controlling a storage apparatus, comprising:
    computer-executable code for saving setting information for making a copy of a logical volume in said storage apparatus to an information processing apparatus for controlling said storage apparatus, each said setting information including a source logical volume and a destination logical volume;
    computer-executable code for transmitting said saved setting information to said storage apparatus;
    computer-executable code for receiving processing results of making a copy of said source logical volume in said destination logical volume for said setting information from said storage apparatus;
    computer-executable code for removing said setting information for which said received processing results were normal and retaining said setting information for which said processing results were errors; and
    computer-executable code for editing said setting information with said errors.

2. The computer-readable medium according to claim 1, wherein, according to a designation of the transmitting order and a selection of said setting information to be transmitted by an operator for a plurality of said setting information to be transmitted to said storage apparatuses, said selected setting information is transmitted in order of said designation to said storage apparatuses.

3. The computer-readable medium according to claim 1, further comprising computer-executable code for displaying at least said setting information in the case of said error on a display screen.

4. The computer-readable medium according to claim 1, wherein said setting information with an error is edited according to an operation by an operator.

5. The computer-readable medium according to claim 4, further comprising
    computer-executable code for transmitting said edited setting information to said storage apparatuses according to an operation by an operator.

6. The computer-readable medium according to claim 5, wherein the action of removing said setting information without errors and retaining said setting information with errors; and the action of transmitting said edited setting information to said storage apparatuses according to an operation by an operator is executed repeatedly.

7. The computer-readable medium according to claim 1, further comprising computer-executable code for adding new setting information based on said setting information with errors.

8. A computer-readable medium containing a program executed with a storage control apparatus for controlling a storage apparatus, said storage control apparatus comprising a control portion for receiving commands from a host device, executing the reading and writing of data to disk devices, and controlling the input and output of data to said disk devices;
    said program comprising steps of:
        displaying an input screen relating to said storage apparatus;
        saving setting information for making a copy of a logical volume in said storage apparatus input through said input screen, each said setting information including a source logical volume and a destination logical volume;
        displaying a region for instructing a transmitting of said saved setting information to said storage apparatuses;
        transmitting said setting information to said storage apparatus upon detecting operation input to said region;
        receiving processing results of making a copy of said source logical volume in said destination logical volume for said setting information from said storage apparatuses;
        removing said setting information for which said received processing results were normal and retaining said setting information for which said processing results were errors; and
        editing said setting information with said error.

9. The computer-readable medium containing said program according to claim 8, wherein each of said source logical volume and said destination logical volume included in said setting information is expressed both in a first format which is used in said host devices for recognition of said logical volume and in a second format which is used in said control portions of said storage devices for recognition of said logical volume.

10. A method for configuring a storage apparatus,
    the method comprising steps of:
    saving setting information for making a copy of a logical volume in said storage apparatus into a storage control apparatus, each said setting information including a source logical volume and a destination logical volume;
    transmitting said saved setting information to said storage apparatus;
    receiving results of the processing of making a copy of said source logical volume in said destination logical volume for said setting information from said storage apparatuses;
    removing said setting information for which said received results were normal and retaining said setting information for which said processing results were errors; and
    editing said setting information with said errors.

11. The method for configuring the storage apparatus according to claim 10, further comprising steps of:
    accepting a selection of the setting information from an operator; and
    accepting a designation of transmitting order for said selected setting information from said operator;
    wherein said selected setting information being transmitted to said storage apparatuses in order of said transmitting order.

12. The method for configuring the storage apparatus according to claim 10, further comprising a step of displaying said setting information in the case of said error on a display screen.

13. The method for configuring the storage apparatus according to claim 10, wherein said setting information with errors being edited according to an operation by an operator.

14. The method for configuring the storage apparatus according to claim 13, further comprising a step of transmitting said edited setting information to said storage apparatuses according to an operation by an operator.

15. The method for configuring the storage apparatus according to claim 13, wherein the action of removing said setting information without errors and retaining said setting information with errors and the action of transmitting the edited setting information to said storage apparatuses is executed repeatedly.

16. The method for configuring the storage apparatus according to claim 13, further comprising a step of adding new setting information based on said setting information with errors.

17. A method for controlling a storage apparatus by a storage control apparatus, said storage control apparatus comprising a control portion for receiving commands from host device, executing the reading and writing of data to disk devices, and controlling the input and output of data to said disk devices,
the method comprising:
a step for displaying setting information input screen relating to the storage of said storage apparatus;
a step for saving setting information for making copies of logical volumes in said storage apparatus input through said input screen, each said setting information including a source logical volume and a destination logical volume;
a step for displaying a region for instructing a transmission of said saved setting information to said storage apparatus;
a step for transmitting said setting information to said storage apparatus upon detection of operation input to said region;
a step for receiving the processing results of making a copy of said source logical volume in said destination logical volume for said setting information from said storage apparatus;
a step for removing said setting information for which said received processing results were normal and retaining said setting information for which said processing results were in errors; and
a step for editing said setting information with said errors.

18. The method for controlling the storage apparatus according to claim 17, wherein each of said source logical volume and said destination logical volume included in said setting information is expressed both in a first format which is used in said host device for recognition of said logical volume and in a second format which is used in said control portions of said disk devices for recognition of said logical volume.

19. A storage control apparatus for controlling a storage apparatus comprising:
a setting information saving means for saving setting information for making a copy of a logical volume in said storage apparatus, each said setting information including a source logical volume and a destination logical volume;
a transmitting means for transmitting said saved setting information to said storage apparatus;
a receiving means for receiving processing results of making a copy of said source logical volume in said destination logical volume for said setting information from said storage apparatus;
an error setting information retaining means for removing said setting information for which said received processing results were normal and retaining said setting information for which said processing results were errors; and
an editing means for editing said setting information with said error.

20. The storage control apparatus according to claim 19, further comprising:
a means for accepting a selection of the setting information from an operator; and
a means for accepting a designation of transmitting order for said selected setting information from said operator;
wherein said transmitting means transmits said selected setting information to said storage apparatus, in order of said transmitting order.

21. The storage control apparatus according to claim 19, further comprising display means for displaying at least said setting information in the case of said error on a display screen.

22. The storage control apparatus according to claim 19, wherein said said setting information with errors being edited according to an operation by an operator.

23. The storage control apparatus according to claim 22, further comprising a means for transmitting the edited setting information to said storage apparatus according to an operation by an operator.

24. The storage control apparatus according to claim 22, wherein an action of removing said setting information without errors and retaining said setting information with errors and an action of transmitting the edited setting information to said storage apparatus is executed repeatedly.

25. The storage control apparatus according to claim 22, further comprising a means for adding new setting information based on said setting information with errors.

26. The storage apparatus controlled by the storage control apparatus according to claim 19, said storage apparatus comprising:
means for receiving a plurality of said setting information for said storage apparatus from said storage control apparatus;
means for copying said source logical volume based on said setting information;
means for notifying said information processing apparatus of the results of said execution, at least of said setting information where an error occurred; and
means for continuing to execute processing relating to other setting information following said setting information where said error occurred.

27. A storage control apparatus for controlling a storage apparatus, said storage control apparatus comprising a control portion for receiving commands from a host device, executing the reading and writing of data to disk devices, and controlling the input and output of data to said disk devices, the storage control apparatus comprising:
a display means for displaying a setting information input screen relating to the storage said storage apparatus;
a means for saving setting information for making copies of logical volumes in said storage apparatus input through said input screen, each said setting information including a source logical volume and a destination logical volume;
a means for displaying a region for instructing a transmission of said saved setting information to said storage apparatus;
a means for transmitting said setting information to said storage apparatus upon detection of operation input to said region;

a means for receiving the processing results of making a copy of said source logical volume in said destination logical volume for said setting information from said storage apparatus;

a means for removing said setting information for -which said received processing results were normal and retaining said setting information for which said processing results were in errors; and a means for editing said setting information with said errors.

28. The storage control apparatus according to claim 27, wherein each of said source logical volume and said destination logical volume included in said setting information is expressed both in a first format which is used in said host device for recognition of said logical volume and in a second format which is used in said control portions of said disk devices for recognition of said logical volume.

* * * * *